United States Patent [19]

Sander

[11] 4,043,495
[45] Aug. 23, 1977

[54] AIR CUSHIONED TURN BAR

[76] Inventor: Frank Sander, 4744 N. Kenneth, Chicago, Ill. 60630

[21] Appl. No.: 717,178

[22] Filed: Aug. 24, 1976

Related U.S. Application Data

[63] Continuation of Ser. No. 554,635, March 3, 1975.

[51] Int. Cl.² .............................................. B65H 23/32
[52] U.S. Cl. ....................................... 226/197; 226/97
[58] Field of Search ............................. 226/7, 97, 197; 239/DIG. 7

[56] References Cited

U.S. PATENT DOCUMENTS

| | | | |
|---|---|---|---|
| 2,702,986 | 3/1955 | Kadosch | 60/35.54 |
| 3,542,621 | 11/1970 | Calhoun | 226/197 X |
| 3,622,058 | 11/1971 | Vits | 226/97 X |
| 3,807,056 | 4/1974 | Norfolk | 226/97 X |

FOREIGN PATENT DOCUMENTS 154,674  1/1954  Australia ...................... 239/DIG. 7

Primary Examiner—Richard A. Schacher

[57] ABSTRACT

An apparatus including a hollow cylindrical member for hydrodynamically supporting and changing the direction of a continuously moving sheet of web material through a predetermined angle. The cylindrical member comprises a series of apertures through which fluid under pressure passes from the hollow portion to the exterior surface of the bar. Each aperture includes a curved surface extending from the hollow portion to the exterior surface, causing the fluid to flow in a laminar path through the aperture. The fluid substantially follows the contour of the exterior surface of the cylindrical bar, thereby forming a fluid cushion for the sheet of web material as it passes over the bar.

4 Claims, 3 Drawing Figures

U.S. Patent   Aug. 23, 1977   4,043,495
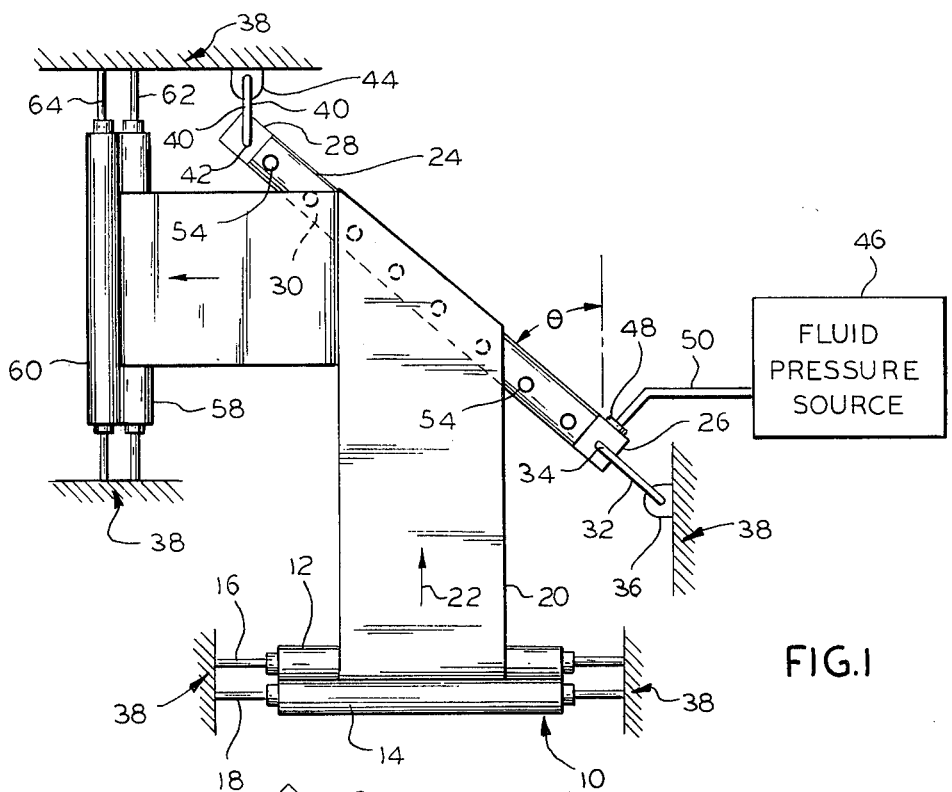
FIG.1
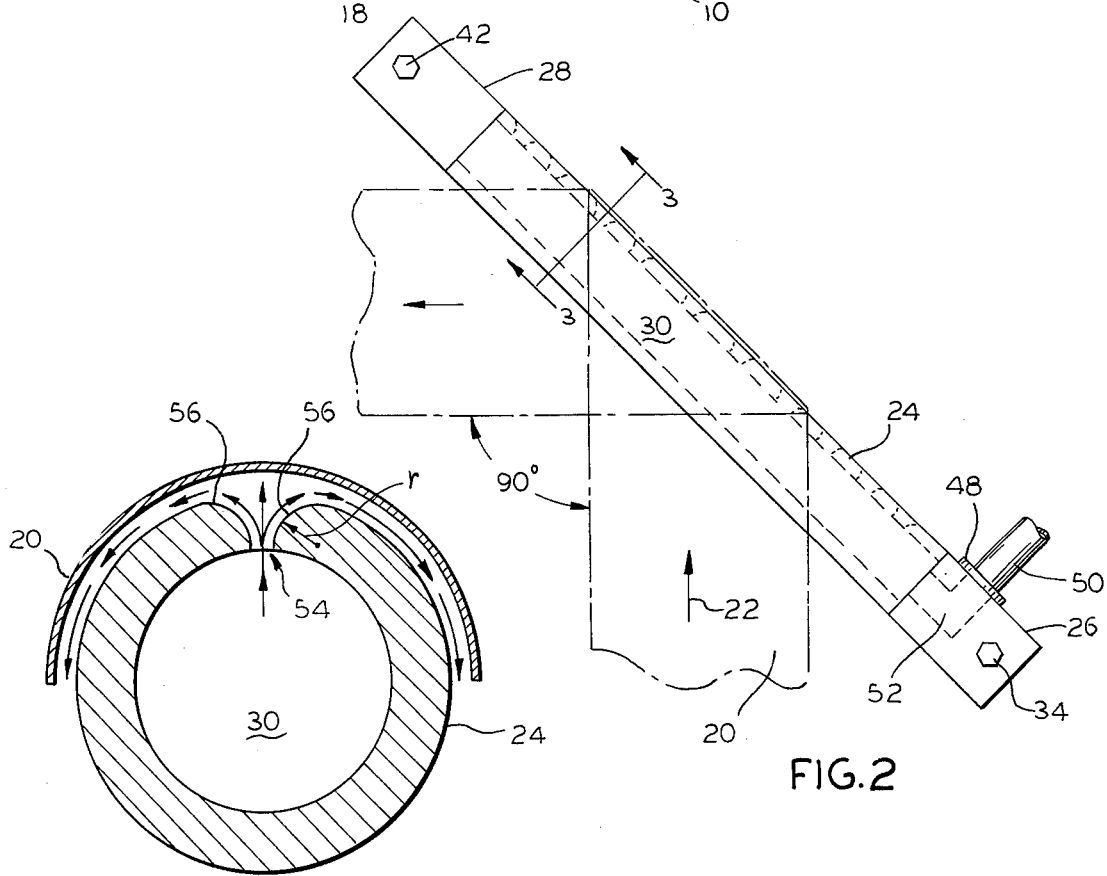
FIG.2
FIG.3

AIR CUSHIONED TURN BAR

This is a continuation of application Ser. No. 554,635, filed Mar. 3, 1975.

The present invention relates generally to web material handling equipment, and in particular to a novel turn bar construction used for changing the direction of a moving sheet of web material.

In certain types of web feeding machinery, web material such as paper, cloth, plastic, metal or the like is processed on a continuous basis while moving through the machinery. It is often necessary or desirable, due to space limitations, or to take advantage of gravity feed processes, to change the direction of the path over which the web material travels.

In such machinery, such as for example a printing device for a newspaper or magazine, turn bars placed at an angle in the path of the web material are used to change the direction of the moving web. The web material is drawn against and passes over the bar at one angle of approach, and leaves at a different angle of departure. For example, if the turning bar were located at 45° to the direction of movement of the web, the material would depart from the turn bar at an angle of 90° from the direction of approach. By varying the angle of the turn bar relative to the direction in which the web material is being fed, the ultimate direction of the material as it leaves the turn bar may be adjusted.

In most applications, it is desirable, if not imperative, to keep the web material from coming into direct contact with the turning bar. The material may be recently imprinted, and thereby carrying a wet image on its surface or surfaces. Also, if the turn bar is dirty or greasy, the dirt or grease may deposit such material on the web. Flaws in the surface of the turn bar may cut or severely scar the surface of the web material. Further, the surface speed of rotation of the turn bar may not match the speed of the web, especially if the web speed is variable.

Devices have been provided to frictionlessly and hydrodynamically support the moving web material on a cushion of fluid, such as air or a gas, as the web passes over the turn bar. One such prior device consists of a cylindrical turn bar with the hollow central portion connected to a source of fluid under pressure. A plurality of holes are drilled in the turn bar, providing a fluid flow path from the hollow portion to the exterior surface of the bar in contact with the web material. In such devices, the holes or apertures in the turn bar have straight or angled walls, and the fluid passing through these apertures exhausts from the exterior surface of the turn bar in substantially a radial direction. This movement of air has a tendency to push the web away from the turn bar with a component of radial force. This force may be sufficient to tear webs made of low-density material. Also, the fluid does not form a uniform cushion along the exterior surface of the turn bar at circumferential points of the bar removed from the apertures.

It has also been observed that with known fluid cushion turn bars, a large quantity of apertures are necessary to provide the proper quality of air cushion for the moving web material. This obviously increases the production costs of the turn bar. Also, in prior devices, a substantial amount of air pressure must be introduced into the hollow portion of the cylindrical bar to provide the necessary cushion.

Therefore, it is a primary object of the present invention to provide a highly efficient and economical construction for a turn bar such as used in web material handling machinery.

A further object of the present invention is to provide a fluid cushion turn bar for web material handling apparatus which requires relatively little fluid pressure to create said fluid cushion.

Still another object of the present invention is to provide a fluid cushion turn bar for web material handling apparatus requiring a minimal amount of apertures in the turn bar.

Another object of the present invention is to provide a hydrodynamic turn bar for web material apparatus wherein the specific aperture design in said turn bar causes a cushion of fluid to form around a portion of the exterior of the turn bar, even in the absence of web material wrapped around the bar.

Accordingly, the present invention relates to a hydrodynamic turn bar for web material handling apparatus, wherein a hollow portion of the turn bar is connected to a source of fluid under pressure, and a plurality of apertures provides a fluid flow path from inside the turn bar to the exterior surface of the bar. The design of each aperture incorporates a curved or radiused surface extending from the inside of the turn bar to the exterior surface of the bar. This shaping of the apertures provides an aerodynamic path for the fluid to follow as it leaves the hollow portion of the bar. As a result of being directed in this aerodynamic path rather than being forced straight out in a radial direction, the fluid flows around the outer surface of the turn bar for approximately 180°. Thus, even without the presence of web material, a fluid cushion is formed around at least half the exterior surface of the turn bar as a result of the specific shaping of the apertures forming the fluid flow path through the bar.

Other objects and advantages of the present invention will be apparent from the following description, read in conjunction with the accompanying drawings in which:

FIG. 1 is a schematic view of a web material handling apparatus, including the novel turn bar construction in accordance with the present invention;

FIG. 2 is a detail view of the novel turn bar of FIG. 1, showing diagramatically how a sheet of web material passes over the bar; and FIG. 3 is a cross-section view of the turn bar taken along the line 3—3 of FIG. 2.

Referring to FIG. 1, there is shown a portion of web material handling apparatus generally designated by the numeral 10. The apparatus comprises a pair of nip rollers 12, 14 which are journaled on fixed shafts 16, 18 for rotation with respect thereto. Shafts 16, 18 are supported by a support frame generally designated by the numeral 38. A sheet of web material 20, such as paper, cloth, plastic, foil, metal or the like passes between rollers 12, 14 and moves in the direction indicated by the arrow 22. The web material is fed to rollers 12, 14 from a supply reel, not shown, or from another part of the web material handling apparatus 10 where a designated process has been applied to web material 20.

Web material 20 continues in the direction indicated by the arrow 22 until it passes over turn bar 24 which is located in the path of the web material. As illustrated in FIGS. 1 and 3, turn bar 24 is generally a cylindrical, hollow bar having its longitudinal axis disposed at an angle $\theta$ to the direction of movement 22 of web material 20. While the angle $\theta$ is determined by the direction at which it is desired to direct web material 20 after it passes over turn bar 24, for purposes of illustration, the angle θ is 45° in the embodiment of FIGS. 1 and 2.

Turn bar 24 comprises cap members 26, 28 located at either end thereof, and which close off the ends of the turn bar to create an air tight chamber in the hollow central portion 30 of turn bar 24. One end of support arm 32 is attached by means of pin 34 to cap member 26. The other end of arm 32 is connected to bracket 36 which is fixed to support frame 38. At the other end of turn bar 24, one end of a second support arm 40 is connected to cap member 28 by means of pin 42. The other end of support arm 40 is connected to support frame 38 by means of bracket 44.

A source of fluid under pressure 46, such as compressed air for example, is connected to a coupling member 48 on cap member 26 by means of a conduit 50. Referring to FIG. 2, coupling member 48 leads to a channel 52 in cap member 48 which terminates at one end of hollow portion 30. Thus, a flow path for the fluid in source 46 is established whereby fluid under pressure is supplied to hollow portion 30 of turn bar 24.

In order to convey the pressurized fluid from hollow portion 30 to the exterior surface of turn bar 24 to produce a hydrodynamic cushion for web material 20, a plurality of apertures 54 are provided at spaced intervals along the longitudinal axis of turn bar 24. These apertures may be disposed in a straight line along the tube bar, or slightly staggered, depending on the dimensions of the required air cushion. Apertures 54 extend from the surface of turn bar 24 into hollow portion 30, thereby forming the requisite flow path for the pressurized fluid 46.

An important feature of the present invention is the configuration of the aperture 54. Each aperture is designed to produce an aerodynamic surface over which the fluid flows as it passes through each aperture. Because of this aerodynamic flow path, the fluid follows the contour of the exterior surface of the turn bar 24 after exhausting from aperture 54 for approximately 180° of the surface. Thus, a fluid cushion is formed adjacent the turn bar even in the absence of web material 20.

The configuration of apertures 54 constructed in accordance with the present invention is best seen in FIG. 3. The walls of each aperture 54 are curved or radiused as they extend from hollow portion 30 to the exterior surface of turn bar 24. This is shown by the radius dimension r in FIG. 3. The curved portions 56 of each aperture form the aerodynamic surface over which the fluid in hollow portion 30 exhausts to the exterior of turn bar 24. As the fluid exhausts over the aerodynamic surfaces 56, the laminar flow of fluid continues adjacent the exterior surface of turn bar 24, and follows the exterior surface for approximately 90° in either direction from each aperture. The fluid cushion thus formed beneath web material 20 effectively covers appoximately 180° of the surface of the turn bar, and allows the web material to pass frictionlessly and cleanly over the bar.

Referring to FIG. 1, the moving sheet of web material 20 has been turned 90° after passing over turn bar 24. The web material then passes between nip rollers 58 and 60, which are journaled for rotation about shafts 62, 64 extending from support frame 39. After passing between nip rollers 58 and 60, the web material 20 is fed to a take-up reel (not shown) or to a further portion of apparatus 10 for additional processing.

It has been observed that because of the specific curved shaping of the walls of apertures 54, the fluid exhausting from the apertures will follow the contour of the exterior of turn bar 24, even in the absence of a sheet of web material over the bar. In addition, an effective fluid cushion can be provided using the present inventive concept with substantially less air pressure being furnished to hollow portion 30 in comparison to prior fluid cushion turn bar devices. It has been observed that the fluid pressure may be reduced by approximately one-half using the presently disclosed device. Further, where previous devices may have required several rows of apertures 54 extending along the length of the turn bar, only a single row, and far fewer apertures, are required using the aerodynamic aperture configuration of the present invention.

I claim:

1. A member for supporting and changing the direction of a continuously moving sheet of web material through a predetermined angle, comprising:
   a hollow cylindrical bar over which said web material passes having a longitudinal axis;
   a plurality of apertures having circular cross-sections disposed along said longitudinal axis of said bar;
   said apertures extending between said hollow portion of said cylindrical bar and the exterior surface of said bar;
   each said aperture including walls forming a continuously diverging curved surface extending in the direction from said hollow portion of said cylindrical bar to said exterior surface of said bar, the intersection of said walls and said exterior surface of said bar being smoothly curved with the exterior surface of the cylindrical bar to produce a laminar flow of fluid substantially coincident with the exterior surface of the cylindrical bar through approximately 180° of said exterior surface, thereby forming a fluid cushion for said sheet of web material.

2. The member of claim 1 including:
   a source of fluid pressures; and
   means for supplying said fluid to said hollow portion of said cylindrical bar whereby said fluid cushion is formed even in the absence of said web material.

3. An apparatus for hydrodynamically supporting and changing the direction of a continuously moving sheet of web material through a predetermined angle, comprising:
   means for feeding said sheet of web material in a given path;
   a hollow cylindrical bar having a longitudinal axis and supported in the path of said web material, whereby said sheet of web material passes over said bar;
   the longitudinal axis of said bar being disposed at an angle to the direction of movement of said web material as said web material approaches said bar, whereby the direction of movement of said web material is changed upon passing over said bar;
   a single row of apertures having circular cross sections disposed along said longitudinal axis of said bar;
   a source of fluid pressure connected to the hollow portion of said cylindrical bar;
   said apertures extending between said hollow portion of said cylindrical bar and the exterior surface of said bar thereby forming a fluid flow path between said hollow portion and said exterior surface;

each said aperture including walls forming a continuously divergent curved surface extending in the direction from said hollow portion to said exterior surface, whereby said fluid exhausts through said apertures and substantially follows the contour of said exterior surface of said bar through approximately 180° of said exterior surface, thereby forming a laminar fluid cushion for said sheet of web material.

4. The apparatus of claim 3 wherein said apertures are disposed in a non-linear manner along said longitudinal axis of said bar.

* * * * *